(12) United States Patent
Skeba et al.

(10) Patent No.: US 7,664,138 B2
(45) Date of Patent: Feb. 16, 2010

(54) MULTIPLE CHANNEL SYSTEM FOR A TWISTED PAIR TELEPHONE WIRE LOCAL LOOP SYSTEM

(75) Inventors: Phillip George Skeba, Wheaton, IL (US); Dale Brian Halling, Colorado Springs, CO (US); Nelson Leon Ledbetter, Batavia, IL (US); Edward R. Folds, Sleepy Hollow, IL (US); Thomas J. J. Starr, Barrington, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1132 days.

(21) Appl. No.: 10/717,102

(22) Filed: Nov. 19, 2003

(65) Prior Publication Data

US 2005/0123002 A1 Jun. 9, 2005

Related U.S. Application Data

(63) Continuation of application No. 09/251,097, filed on Feb. 16, 1999, now Pat. No. 6,687,261.

(51) Int. Cl.
*H04J 3/16* (2006.01)

(52) U.S. Cl. .................. 370/468; 370/345; 379/93.01

(58) Field of Classification Search ............... 370/348, 370/468, 345
See application file for complete search history.

(56) References Cited

U.S. PATENT DOCUMENTS

| | | | | |
|---|---|---|---|---|
| 5,892,833 A * | 4/1999 | Maag et al. | ............ | 381/98 |
| 5,909,463 A * | 6/1999 | Johnson et al. | ............ | 375/220 |
| 5,949,813 A * | 9/1999 | Hunsinger et al. | ............ | 375/142 |
| 5,956,624 A * | 9/1999 | Hunsinger et al. | ............ | 455/65 |
| 6,064,662 A * | 5/2000 | Gitlin et al. | ............ | 370/330 |
| 6,137,839 A * | 10/2000 | Mannering et al. | ............ | 375/260 |
| 6,262,972 B1 * | 7/2001 | McGinn et al. | ............ | 370/210 |
| 6,307,839 B1 * | 10/2001 | Gerszberg et al. | ............ | 370/235 |
| 6,385,203 B2 * | 5/2002 | McHale et al. | ............ | 370/401 |
| 6,473,474 B1 * | 10/2002 | Wiegand | ............ | 375/350 |
| 6,735,245 B1 * | 5/2004 | Palm | ............ | 375/222 |

\* cited by examiner

*Primary Examiner*—Phuc Tran
(74) *Attorney, Agent, or Firm*—Hanley, Flight & Zimmerman

(57) ABSTRACT

The system (50) has a subscriber digital filter system (54) connected to the twisted pair telephone wire (56). A subscriber controller (52) sends control signals to the subscriber digital filter system (54). An office digital filter system (58) is connected to the twisted pair telephone wire (56). An office controller (60) sends control signals to the office digital filter system (58).

7 Claims, 9 Drawing Sheets

MULTIPLE CHANNEL SYSTEM FOR A TWISTED PAIR TELEPHONE WIRE LOCAL LOOP SYSTEM

Related Applications

The present application is a continuation- of application Ser. No. 09/251,097, filed Feb. 16, 1999 now U.S. Pat. No. 6,687,261 assigned to the same assignee as the present application.

FIELD OF THE INVENTION

The present invention relates to local loop telephony systems and more particularly to a multiple channel system for a twisted pair telephone wire local loop system.

BACKGROUND OF THE INVENTION

The advent of the Internet and intranets has created a need for a system that provides additional bandwidth in the local loop to businesses and homes. Dial-up modems appear to be limited to 56 Kbps (Kilo Bits Per Second). This significantly limits the amount of graphics and multimedia information that can be transferred over a given period of time. ISDN (Integrated Digital Services Network) lines provide speeds of 128 Kbps and ISDN lines are always on (in one configuration) providing instant connections to the Internet. ISDN lines are still not fast enough for many multimedia applications and are expensive. ASDL (Asymmetric Subscriber Digital Lines) or DSL (Digital Subscriber Lines) provide data rates between 128 Kbps upstream to +8 Mbps downstream. Commonly the data rate from the service provider to the subscriber (downstream) is faster than from the subscriber to the service provider (upstream). The ASDL lines are a significant improvement. However twisted pair telephone wires have bandwidth capabilities over limited distances of up to 30 MHz. None of the present solutions take full advantage of this available bandwidth. In addition, presently the twisted pair telephone line is treated as a single connection. However, there are proposals to unbundle the local loop. bandwidth over twisted pair telephone wires. Presently, the only unbundled solution provides a POTS (Plain Old Telephone Service) channel and an ASDL channel over the same twisted pair.

Thus there exists a need for a system that takes advantage of the available bandwidth over twisted pair telephone wires in the local loop and can unbundle the available bandwidth.

DETAILED DESCRIPTION OF THE DRAWINGS

The present invention takes full advantage of the bandwidth available over twisted pair telephone wires in the local loop. The system, in one embodiment, includes a subscriber digital filter system connected to a twisted pair telephone wire. The subscriber digital filter system is controlled by a subscriber controller. An office digital filter system is connected to the twisted pair telephone wire. The office digital filter system is controlled by an office controller. The office controller determines what bandwidth is available based on a request for bandwidth. When the office controller determines that the bandwidth is available, it programs the digital filter to create a filter allowing the requested bandwidth to flow over the twisted pair telephone wires. Note that the digital filter system may have to up-convert the signal to a center frequency of the available bandwidth. This system allows the bandwidth to be divided in a variety of bandwidth sizes and allows the bandwidth to be unbundled for a variety of users.

Figure 1:
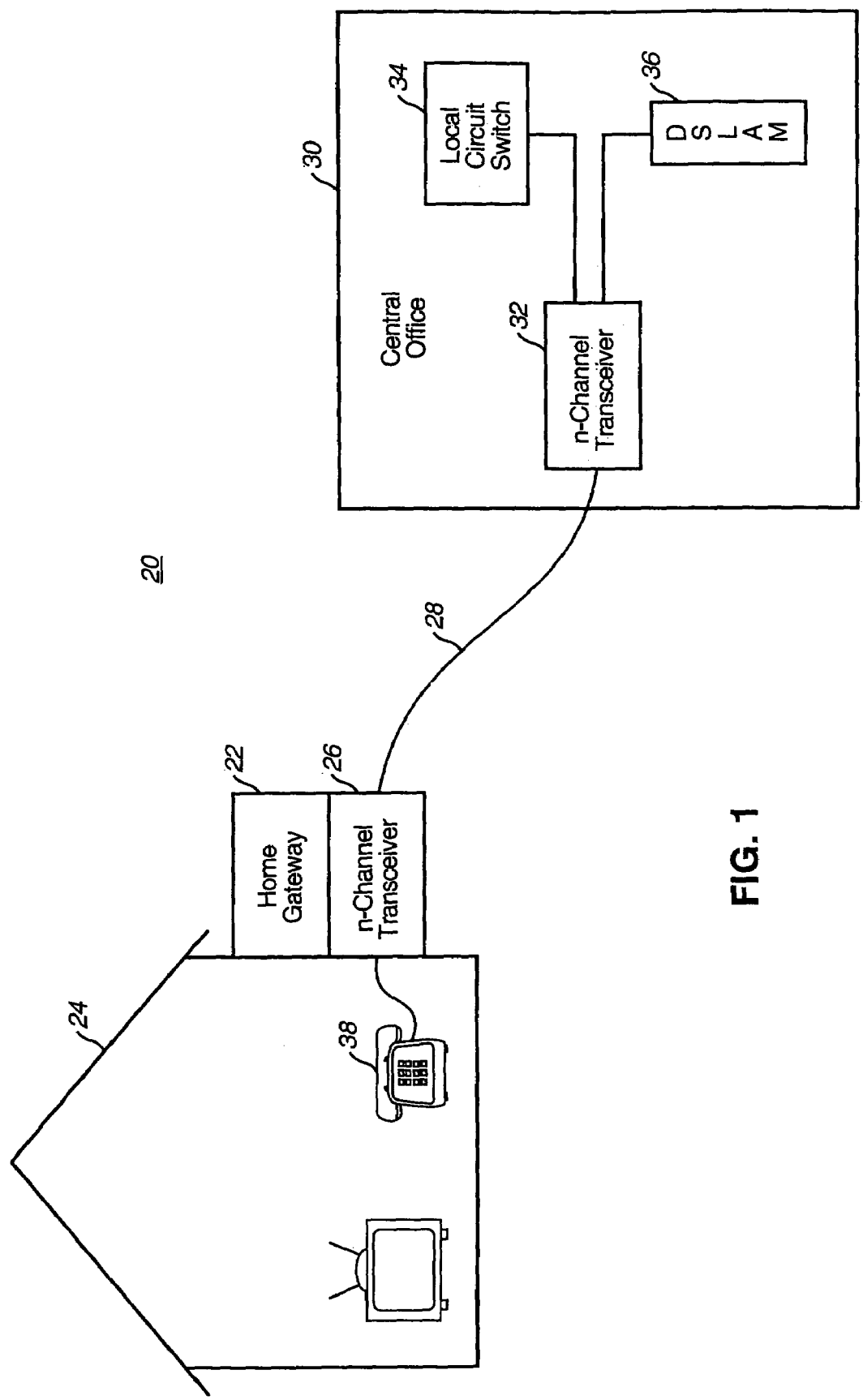
FIG. 1 is a multiple channel system for a twisted pair telephone wire local loop system in accordance with one embodiment of the invention.

FIG. 1 is a multiple channel system 20 for a twisted pair telephone wire local loop system in accordance with one embodiment of the invention. A subscriber gateway system 22 is shown attached to the outside of a house 24. In another embodiment the subscriber gateway system 22 is inside the house or attached to an office building. The subscriber gateway system 22 includes an n-channel transceiver 26. The n-channel transceiver 26 is connected to a twisted pair telephone wire 28. A central office 30 of the telephone network includes an office n-channel transceiver 32 is connected to the twisted pair telephone wire 28. An output of the n-channel transceiver 32 is connected to a local circuit switch 34. The local circuit switch 34 provides standard circuit switch telephone service. The output of the n-channel transceiver (second multiple channel transceiver) 32 is also connected to a digital subscriber line access multiplexer (DSLAM) 36. The DSLAM 36 provides access to a data network. In one embodiment the n-channel transceiver (subscriber transceiver, first multiple channel transceiver) 26 in the subscriber gateway 22 is connected to a POTS (Plain Old Telephone Service) telephone 38. Note that while the example is explained in connection with a central office, the system will work essentially the same with a hub switch office or other telephone switching office.

Figure 2:
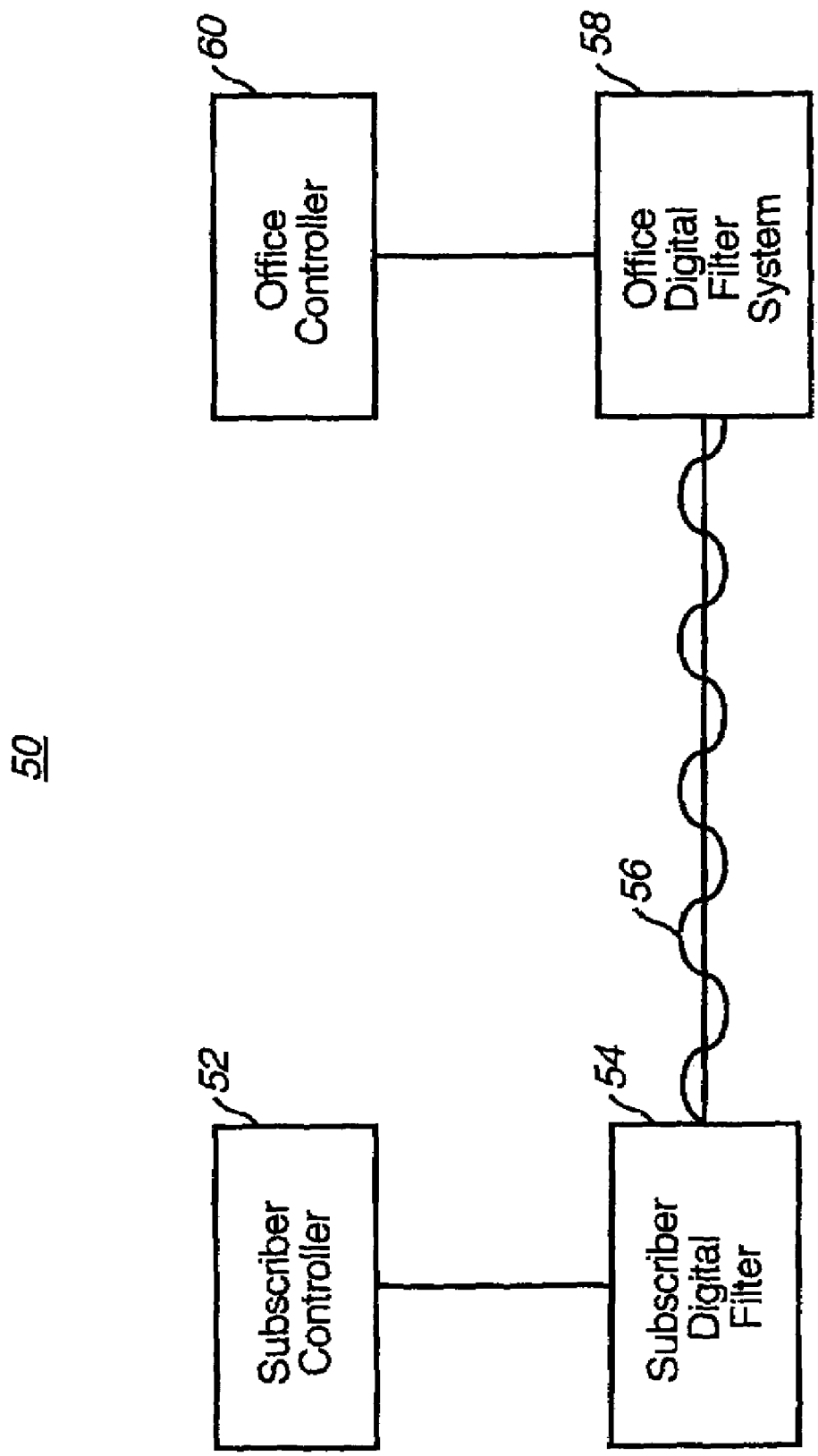
FIG. 2 is a multiple channel system for a twisted pair telephone wire local loop system in accordance with another embodiment of the invention.

FIG. 2 is a multiple channel system 50 for a twisted pair telephone wire local loop system in accordance with another embodiment of the invention. A subscriber controller (first controller) 52 is coupled to a subscriber digital filter 54. The subscriber controller 52 sends control signals to the subscriber digital filter 54, such as filter requirements. The subscriber digital filter 54 is connected to a twisted pair telephone wire 56. The other end of the twisted pair telephone wire 56 is connected to an office digital filter system 58. The office digital filter system 58 is controlled by an office controller (second controller) 60. Note that digital filtering systems were selected for versatility. Digital filters can be configured to meet a wide range of filter bandwidths. This makes a digital filter system more flexible than a bank of analog filters, however an analog filter system could be used instead of the digital filter systems.

Figure 3:
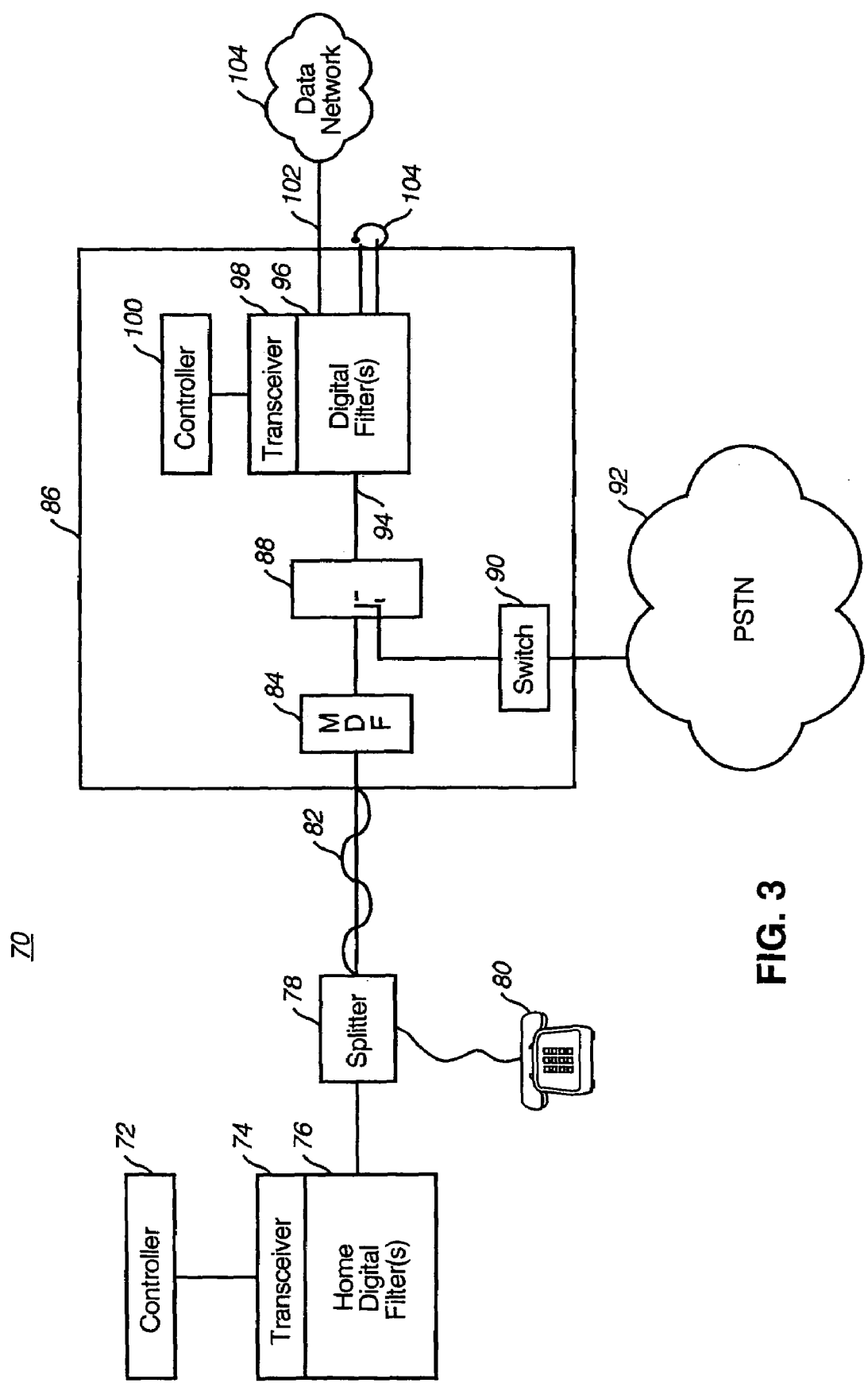
FIG. 3 is a multiple channel system for a twisted pair telephone wire local loop system in accordance with another embodiment of the invention.

FIG. 3 is a multiple channel system 70 for a twisted pair telephone wire local loop system in accordance with another embodiment of the invention. A controller 72 is connected to a transceiver 74 and a home digital filter system 76. The transceiver 74 can be part of the digital filter system and is used to up-convert and down-convert signals in the frequency domain. In addition, the transceiver 74 can be used to create a link quality check. For instance, the transceiver 74 can send or receive a known pseudo-random sequence. A bit error rate can then be calculated. This allows the system 70 to perform link quality checks (link quality testing system) for any bandwidth a customer may want to use. The digital filter system 76 is connected to a splitter 78 in one embodiment. The splitter separates a low frequency analog voice signal from the high frequency signals. The splitter 78 is also connected to a POTS telephone 80. The splitter 78 is connected to a twisted pair telephone wire 82. The other end of the twisted pair telephone wire 82 connects to a Main Distribution Frame (MDF) 84 in a telephone office 86. The MDF 84 is connected to a splitter 88 that passes the low frequency analog telephone signals to a standard circuit switched telephone service switch 90. The telephone switch 90 is connected to the public switched telephone network 92. The high frequency signals 94 are passed to the digital filter(s) 96 and transceiver 98. A controller 100 directs the operations of the transceiver 98 and the digital filter(s) 96. The output 102 is connected to a data network 104, in one embodiment. While other outputs 104 are ports that can be connected to other data sources with which the customer may need to communicate. These other data sources could include, CATV (cable TV), other video source, pay per view video, sensors, etc. The invention is not limited to any particular transmission protocol and several transmission protocols that may be used are discussed with respect to FIGS. 4-7. Note that if an all digital transceiving system is used, any or all of these and other transmission protocols could be implemented using essentially the same equipment. Since the maximum frequency we are discussing is around 30 MHz, it would be easy to digitize all the incoming data using existing analog to digital converters (A/Ds). This allows the digital transceiving system the flexibility to implement almost any transmission scheme.

Figure 4:
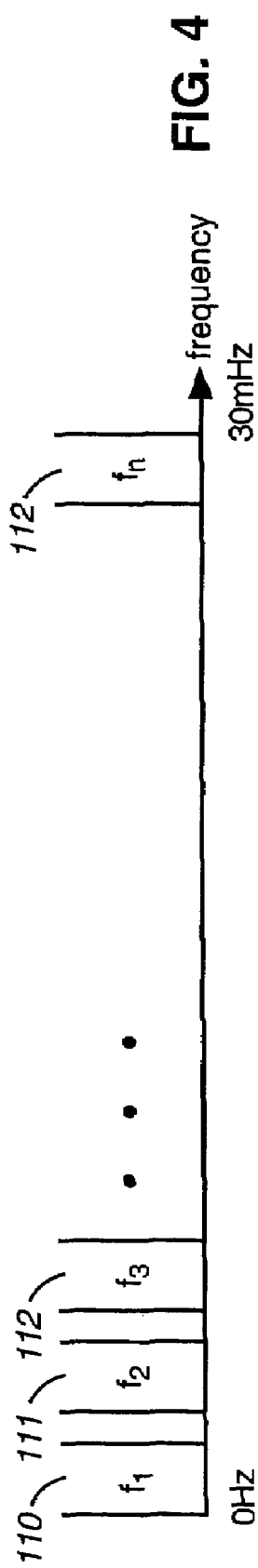
FIG. 4 is a schematic diagram of a frequency division multiplexing system in accordance with one embodiment of the invention.

FIG. 4 is a schematic diagram of a frequency division multiplexing (FDM) system in accordance with one embodiment of the invention. The invention may divide the various channels on the basis of their frequencies. For instance, a first channel 110 may occupy the frequencies between zero and 3 KHz. Every channel 112 may then be defined to occupy 3 KHz of bandwidth. However, this is extremely limiting and the preferred embodiment would allow an almost infinite range of bandwidths and center frequencies for a channel.

Figure 5:
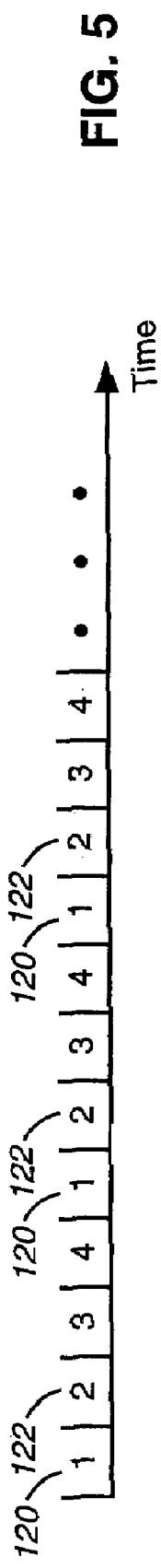
FIG. 5 is a schematic diagram of a time division multiplexing system in accordance with one embodiment of the invention.

FIG. 5 is a schematic diagram of a time division multiplexing system (TDM) in accordance with one embodiment of the invention. In a time division multiplexing scheme a channel 120 is defined by a periodic time slot. Other channels 122 occupy other non-overlapping periodic time slots. Note that time division multiplexing may be easily combined with a frequency division multiplexing scheme as is done in some of the PCS (Personal Communication System) system standards.

Figure 6:
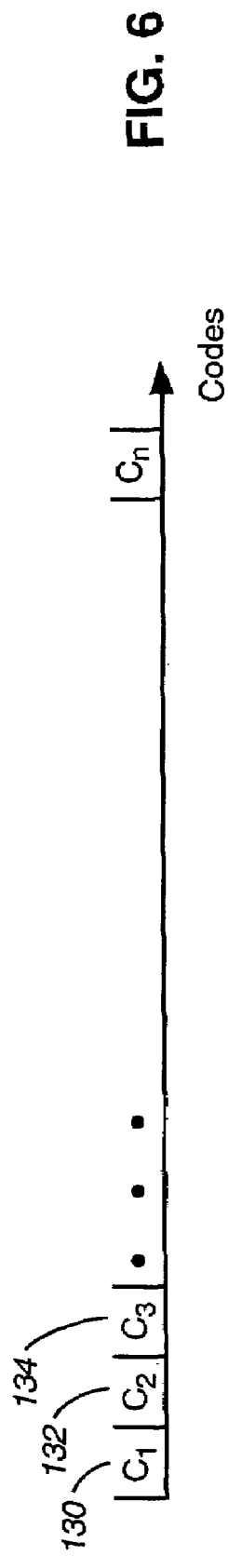
FIG. 6 is a schematic diagram of a code division multiplexing system in accordance with one embodiment of the invention.

FIG. 6 is a schematic diagram of a code division multiplexing system in accordance with one embodiment of the invention. In a code division multiplexing system several channels are sent over the same bandwidth and are distinguished based on their code $(C_1)$ 130, $(C_2)$ 132, $(C_3)$ 134. Note that this multiplexing system can be combined with frequency division multiplexing schemes (or potentially with TDM schemes) as is done in another of the PCS standards.

Figure 7:
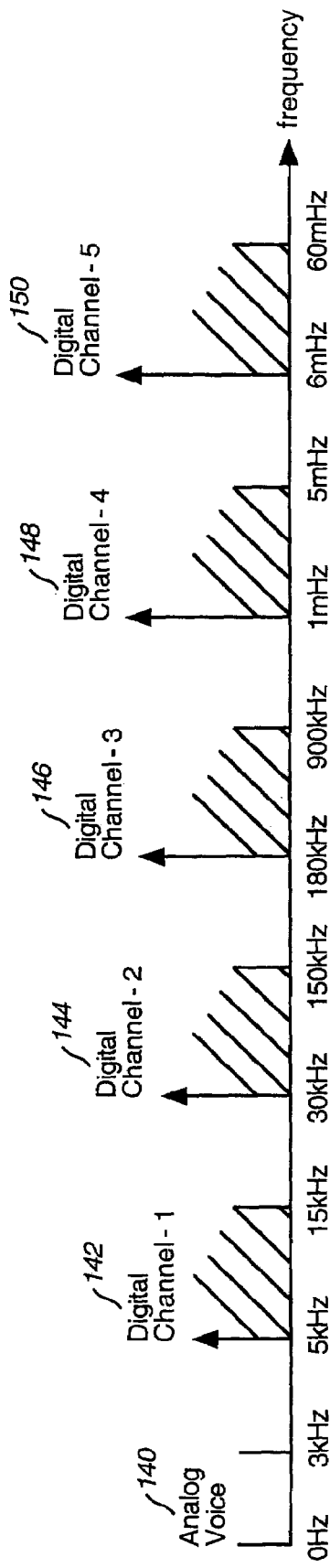
FIG. 7 is a schematic diagram of a baseband frequency division multiplexing system in accordance with one embodiment of the invention.

FIG. 7 is a schematic diagram of a baseband frequency division multiplexing system in accordance with one embodiment of the invention. The baseband frequency division multiplexing scheme requires that the data be manchester encoded, so that a transition occurs for every bit of data sent. Ideally the transmission protocol also sends "filler" data when no data is being sent. An example would be ATM (Asynchronous Transfer Mode), which sends filler packets. When these conditions are fulfilled then the data's lowest frequency is the clock rate of the data. For instance, if the data is clocked at 6 MHz, the lowest frequency component of the data is 6 MHz. A perfect square wave would then have frequency components at the fundamental frequency and the odd harmonics of the fundamental frequency. This allows another baseband signal to be placed below the original signal as long as the new signal is filtered to have no frequency components at or above the fundamental frequency of the original signal. An example is illustrated in FIG. 7. The frequency band 140 between 0-3 KHz is reserved for analog (POTS, voice signal) telephone service. A second frequency band 142 between 5 KHz and 25 KHz is reserved for a digital baseband signal (data signal), channel-1. Channel-1 has a fundamental frequency of 5 KHz and is filtered to eliminate frequencies above 25 KHz. A second digital baseband signal 144 occupies the frequencies between 30 KHz and 150 KHz. A third digital baseband signal 146 occupies the frequencies between 180 KHz and 900 KHz. A fourth digital signal 148 occupies the frequencies between 1 MHz and 5 MHz. A fifth digital signal 150 occupies the frequencies between 6 MHz and 30 MHz. This scheme as implemented in FIG. 7 provides five digital channels of varying data rate capabilities (plurality of baseband signals). Numerous other schemes could be implemented as will be apparent to those skilled in the art.

Figure 8:
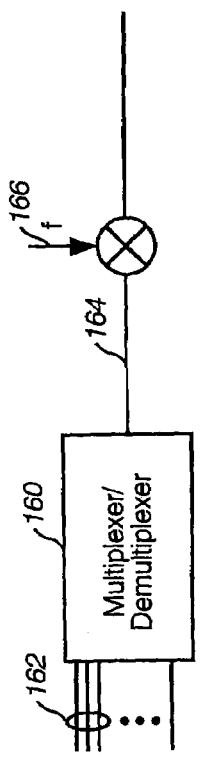
FIG. 8 is a block diagram of a time division multiplexing scheme in accordance with one embodiment of the invention.

FIG. 8 is a block diagram of a time division multiplexing scheme in accordance with one embodiment of the invention. A multiplexer/demultiplexer 160 receives a plurality of signals 162. The multiplexed signals 164 are modulated by a carrier frequency 166 at a mixer 168 to form a plurality of time division multiplexed signals. Alternatively the signals can first be modulated (ASK—Amplitude Shift Keying, FSK—Frequency Shift Keying, PSK—Phase Shift Keying, etc.) then up-converted to the carrier frequency. When signals are received, the process is reversed, the signals are down-converted and demodulated. The demultiplexer 160 splits the signal into multiple channels 162. Note that commonly the receive and transmit paths are separated. FIG. 8 is a simple block diagram to illustrate the concept of time division multiplexing.

Figure 9:
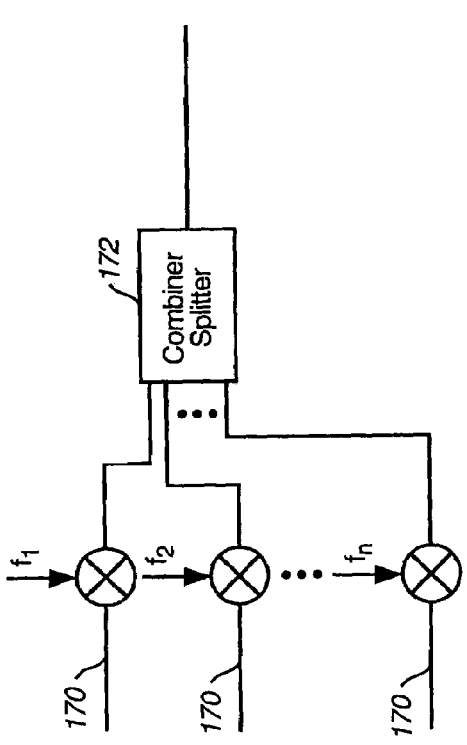
FIG. 9 is a block diagram of a frequency division multiplexing scheme in accordance with one embodiment of the invention.

FIG. 9 is a block diagram of a frequency division multiplexing scheme in accordance with one embodiment of the invention. Only the transmit path with be explained. The receive path will operate similarly in reverse as will be apparent to those skilled in the art. A plurality of channels 170 are up-converted by carrier frequencies f1, f2—fn. The signals are then combined by a combiner 172 to form a plurality of frequency division multiplexed signals. Note the signal 170 can be modulated before being up-converted.

Figure 10:
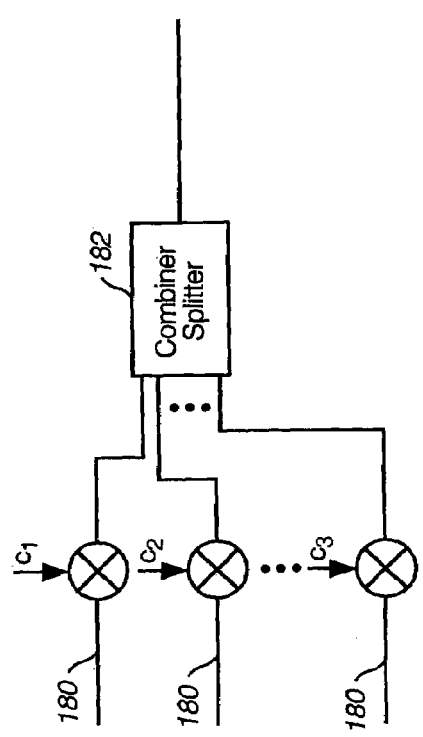
FIG. 10 is a block diagram of a code division multiplexing scheme in accordance with one embodiment of the invention.

FIG. 10 is a block diagram of a code division multiplexing scheme in accordance with one embodiment of the invention. Only the transmit path with be explained. The receive path will operate similarly in reverse as will be apparent to those skilled in the art. A plurality of channels 180 are modulated by codes C1, C2 & Cn. The signals are then combined by a combiner 182 to form a plurality of code division multiplexed signals. Note the combined signals can be modulated after being combined.

Figure 11:
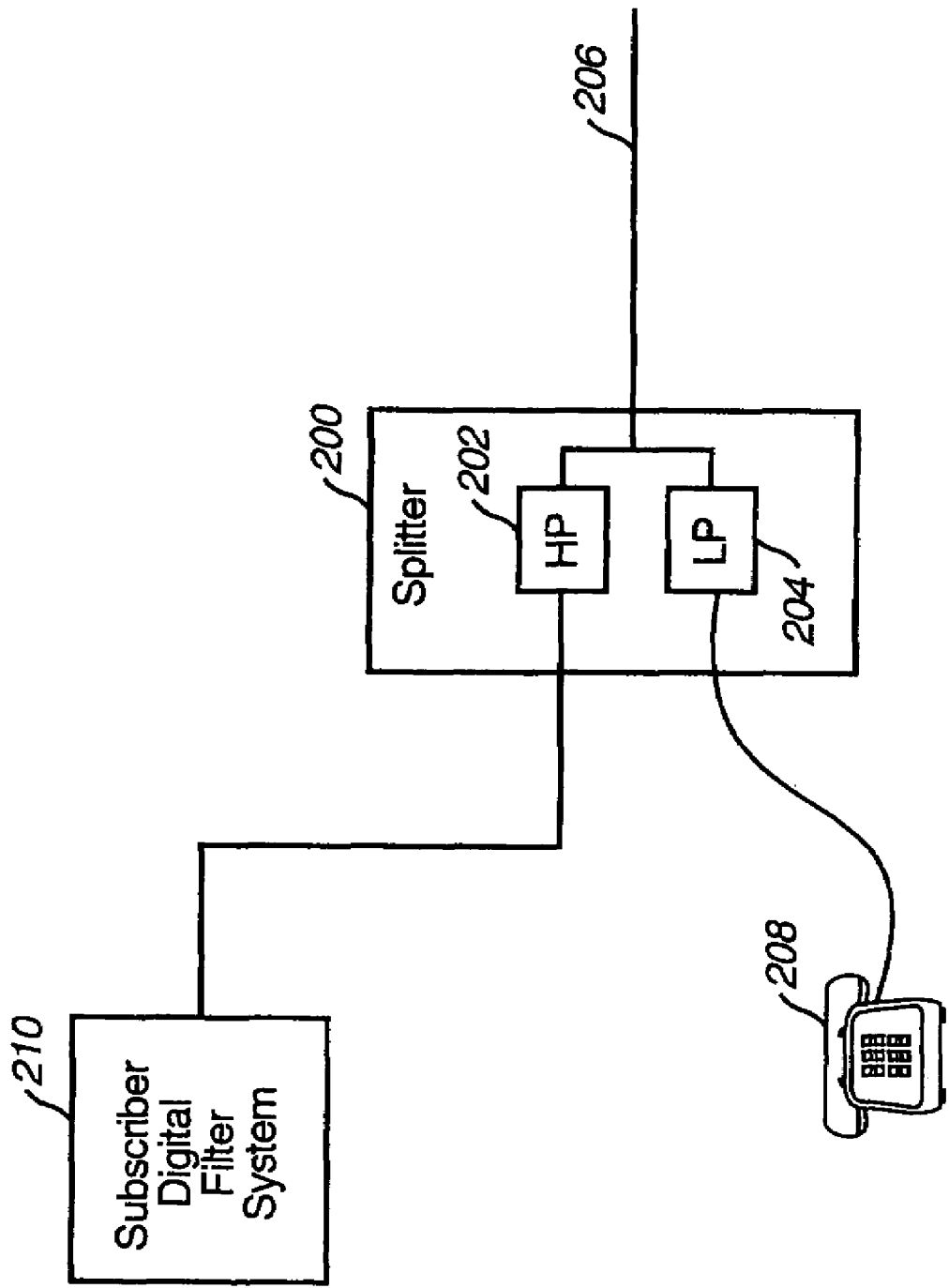
FIG. 11 is a block diagram of a subscriber system in accordance with one embodiment of the invention.

FIG. 11 is a block diagram of a subscriber system in accordance with one embodiment of the invention. A splitter 200 includes a high pass filter 202 and a low pass filter 204. In one embodiment, the high pass filter 202 and the low pass filter 204 are analog filters. The splitter 200 is connected to a twisted pair telephone wire 206. The low pass filter (low pass output, analog low pass filter) 204 is connected to a POTS telephone 208. The high pass filter (high pass output, analog high pass filter) is connected to a subscriber digital filter system 210.

Figure 12:
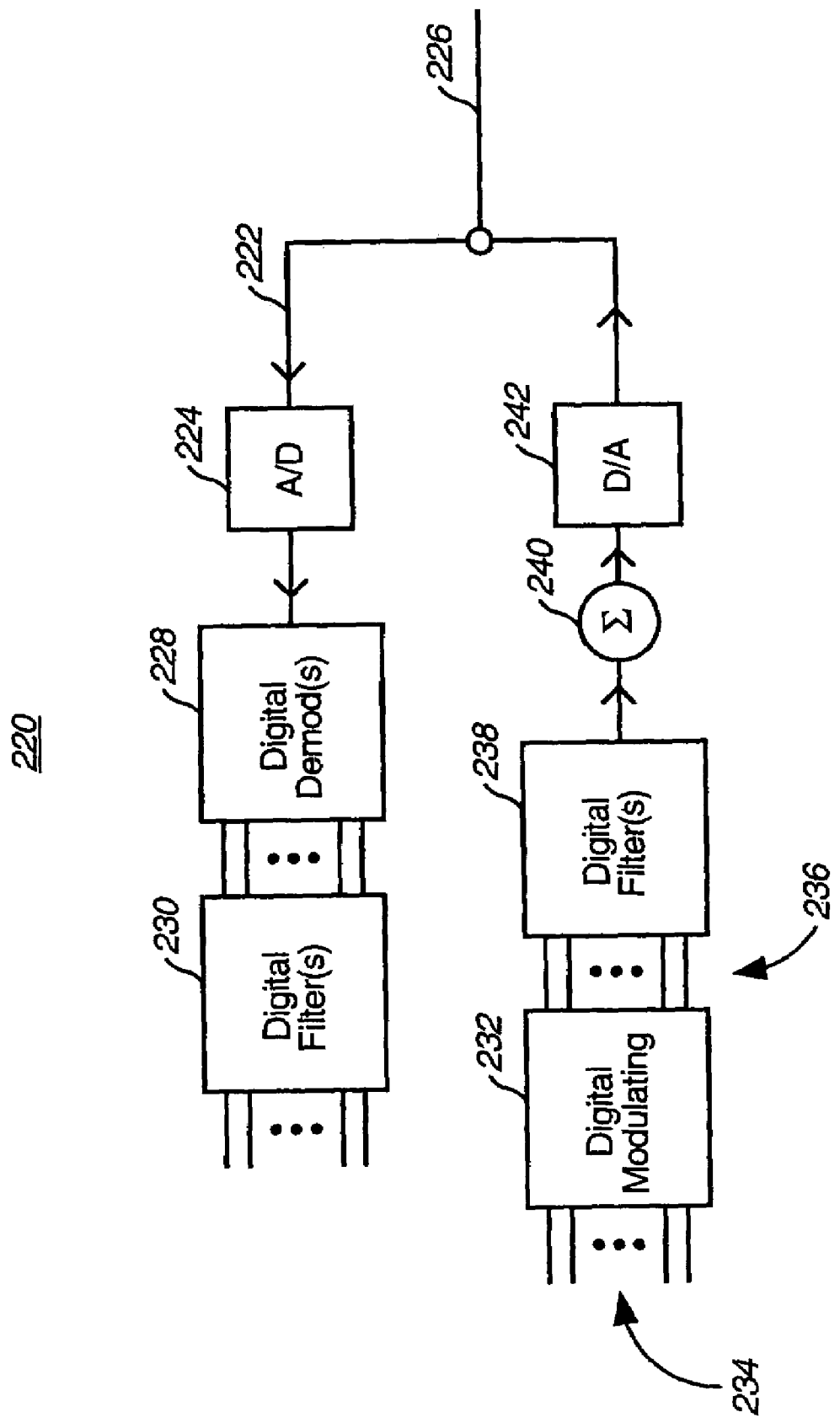
FIG. 12 is a block diagram of a digital filter system in accordance with one embodiment of the invention.

FIG. 12 is a block diagram of a digital filter system 220 in accordance with one embodiment of the invention. An incoming signal 222 is converted from an analog to digital signal by an A/D 224. Note that existing digitizers can easily digitize all 30 MHz that can be carried by a twisted pair telephone wire 226. The digitized signals are demodulated by a plurality of digital modulators 228. The digital demodulators 228 can be implemented using a DSP (digital signal processor). The digital demodulators 228 can be designed to handle an FDM, TDM or CDM signal. The process of building a digital demodulator for any of these multiplexing systems is know to those skilled in the art. In addition, each demodulator can detect any modulation scheme, such as ASK, FSK, PSK, etc. A plurality of digital filters 230 may be used to eliminate unwanted frequencies.

The transmit path starts by a plurality of digital modulators 232 modulating a plurality of signals 234. The modulated signal 236 are passed through a plurality of digital filters 238. The digital signals are then summed by a summer 240. The summed signals are then converted to an analog signal by a D/A for transmission over the twisted pair 226. As noted above all these system blocks can be implemented in a DSP. Depending on the multiplexing scheme, the exact function performed by the blocks changes slightly, however these blocks can be used to build any multiplexing and modulation system.

Figure 13:
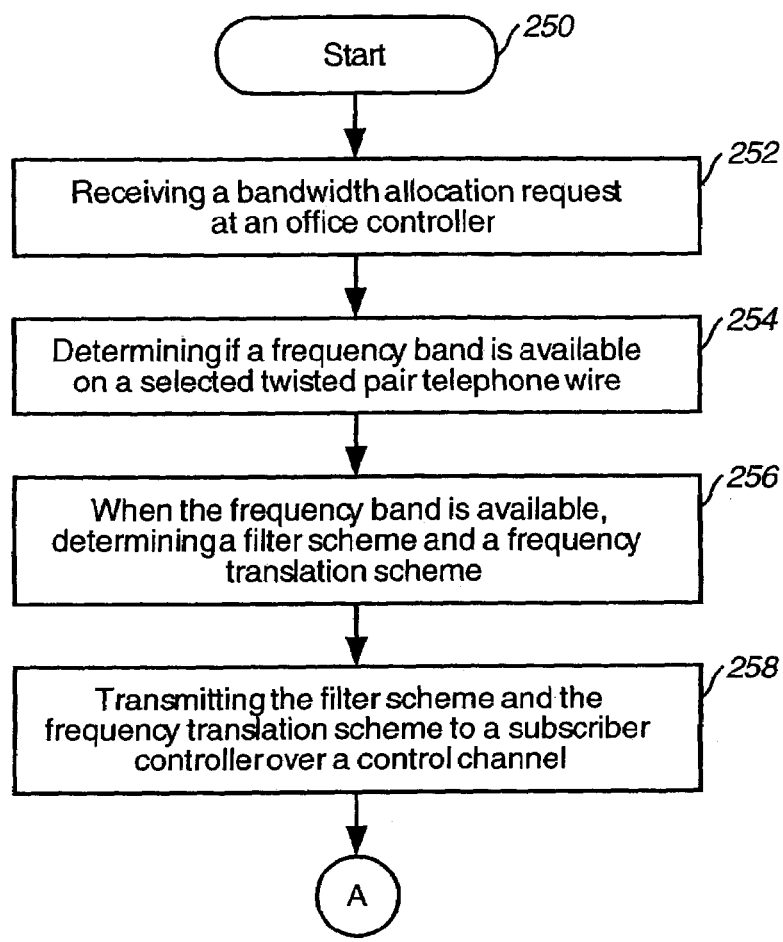
FIGS. 13 & 14 are a flow chart of the steps used in implementing a multiple channel system for a twisted pair telephone wire local loop system in accordance with another embodiment of the invention.
Figure 14:
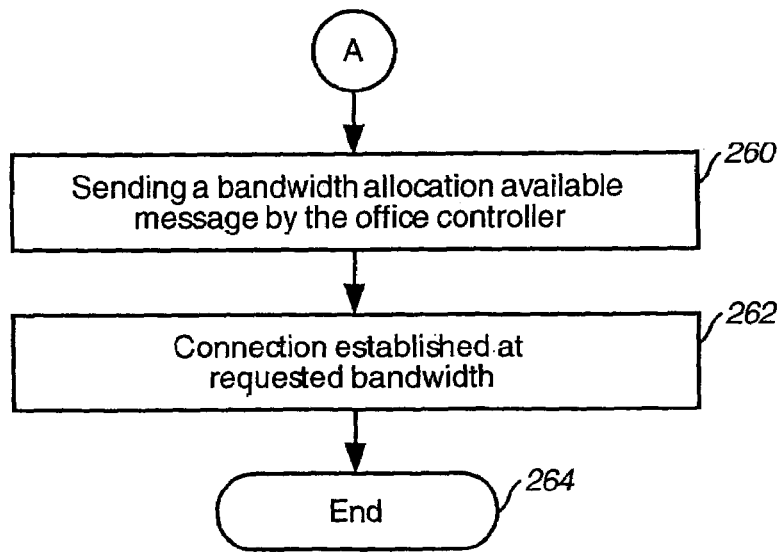

FIGS. 13 & 14 are a flow chart of the steps used in implementing a multiple channel system for a twisted pair telephone wire local loop system in accordance with another embodiment of the invention. The process starts, step 250, by receiving a bandwidth allocation request at an office controller at step 252. Next it is determined if a frequency bands available on a selected twisted pair telephone wire at step 254. When the frequency band is available, a filter scheme and a frequency translation scheme are determined at step 256. The filtering and frequency translation scheme are used to move the incoming signal to the available frequency band. The filter and frequency translation schemes are transmitted to a subscriber controller over a control channel at step 258. At step 260 a bandwidth allocation available message is sent to the office controller. At step 262 the connection is established at the requested bandwidth, which ends the process at step 264.

The availability of a frequency band includes selecting an unused section of frequency in one embodiment. Next it is determined if the unused section of frequency has sufficient bandwidth. When the unused section of frequency has sufficient bandwidth, a link quality analysis is performed. When the link quality analysis is greater than a predetermined minimum, the unused section of frequency is considered available.

Thus there has been described a system that takes advantage of the available bandwidth over twisted pair telephone wires in the local loop and can unbundle the available bandwidth.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A multiple channel system for a twisted pair telephone wire local loop system, comprising:
   a subscriber gateway system having a first transceiver coupled to the twisted pair telephone wire, the first transceiver to send and receive via multiple independent channels;
   a second transceiver at a central office coupled to the twisted pair telephone wire, the second transceiver to send and receive via the multiple independent channels; and
   a plurality of digital filters, operatively coupled to the first and second transceivers, configured to implement a frequency translation scheme, wherein the digital filters are to operate according to the frequency translation scheme to move a signal to an available frequency band associated with the multiple independent channels.

2. A multiple channel system as defined in claim 1, further comprising a digital subscriber line access multiplexer coupled to an output of the second transceiver.

3. A multiple channel system as defined in claim 1, further comprising a plurality of digital demodulators and a plurality of digital modulators coupled to the digital filters.

4. A multiple channel system as defined in claim 1, wherein the first transceiver in the subscriber gateway is to transmit a plurality of frequency division multiplexed signals.

5. A multiple channel system as defined in claim 1, wherein the first transceiver in the subscriber gateway is to transmit a plurality of time division multiplexed signals.

6. A multiple channel system as defined in claim 1, wherein the first transceiver in the subscriber gateway is to transmit a plurality of code division multiplexed signals.

7. A multiple channel system as defined in claim 1, further comprising a local circuit switch coupled to an output of the second transceiver.

* * * * *

UNITED STATES PATENT AND TRADEMARK OFFICE
CERTIFICATE OF CORRECTION

PATENT NO. : 7,664,138 B2 Page 1 of 1
APPLICATION NO. : 10/717102
DATED : February 16, 2010
INVENTOR(S) : Skeba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1789 days.

Signed and Sealed this

Twenty-eighth Day of December, 2010

David J. Kappos
*Director of the United States Patent and Trademark Office*